INVENTORS:
Maurice J. Brau
Rowland E. Johnson
Robert J. Patterson

BY John D. Graham
ATT'Y 3,360,649
Ge-Sb-Se GLASS COMPOSITIONS
Maurice J. Brau, Richardson, and Rowland E. Johnson and Robert J. Patterson, Dallas, Tex., assignors to Texas Instruments Incorporated, Dallas, Tex., a corporation of Delaware
Filed Apr. 22, 1965, Ser. No. 449,994
5 Claims. (Cl. 250—83)

ABSTRACT OF THE DISCLOSURE

Disclosed are compositions of matter comprising germanium, antimony, and selenium, many samples of which have been found to be amorphous glasses transmitting in the infrared region of the electromagnetic spectrum and some samples of which have been found to be crystalline. Also disclosed are methods of compounding and casting said amorphous glasses, and an illustration of the use of the glass compositions of this invention as an infrared transmitting element within an infrared detection system.

---

This invention relates to amorphous compositions of matter. More particularly it relates to infrared transparent glasses.

The invention disclosed herein appertains to germanium-antimony-selenium amorphous glass compositions which are transparent to the infrared region of the electromagnetic spectrum. Moreover, the invention provides amorphous glass compositions having good transmission in the one to 20 micron wave length region of the electromagnetic spectrum.

The glass of the invention may contain about 5 to 37 atomic percent germanium, from 0 to 28 atomic percent antimony, and 53 to 85 atomic percent selenium, and may be made by reacting the constituents to form a melt and quench-cooling the melt from about 800° C. to 900° C. to room temperature in air.

It is therefore an object of the invention to provide a ternary amorphous glass composition comprising in major proportion, or consisting essentially of, germanium, antimony, and selenium.

Another object of the invention is to provide an amorphous glass composition having a high transmission in the one to 20 micron wave length region of the electromagnetic spectrum.

A further object of the invention is to provide a ternary amorphous glass composition comprising in major proportion, or consisting essentially of, from 5 to 37 atomic percent germanium, from 0 to 28 atomic percent antimony, and 53 to 85 atomic percent selenium.

Another object of this invention is to provide a ternary germanium-antimony-selenium amorphous glass composition having good transmission at high temperatures in the one to 20 micron wave length region of the electromagnetic spectrum.

Still another object of the invention is to provide a ternary germanium-antimony-selenium amorphous composition of matter exhibiting a high softening point and good transmission in the one to 20 micron region of the electromagnetic spectrum.

Another object of the invention is to provide a transmitting element in an infrared detection system, said element comprising in major proportion 5 to 37 atomic percent germanium, from 0 to 28 atomic percent antimony, and 53 to 85 atomic percent selenium.

These and other objects, advantages and features of the invention will become more readily apparent from the following detailed description when read in conjunction with the appended claims and attached drawings wherein:

Figure 1:
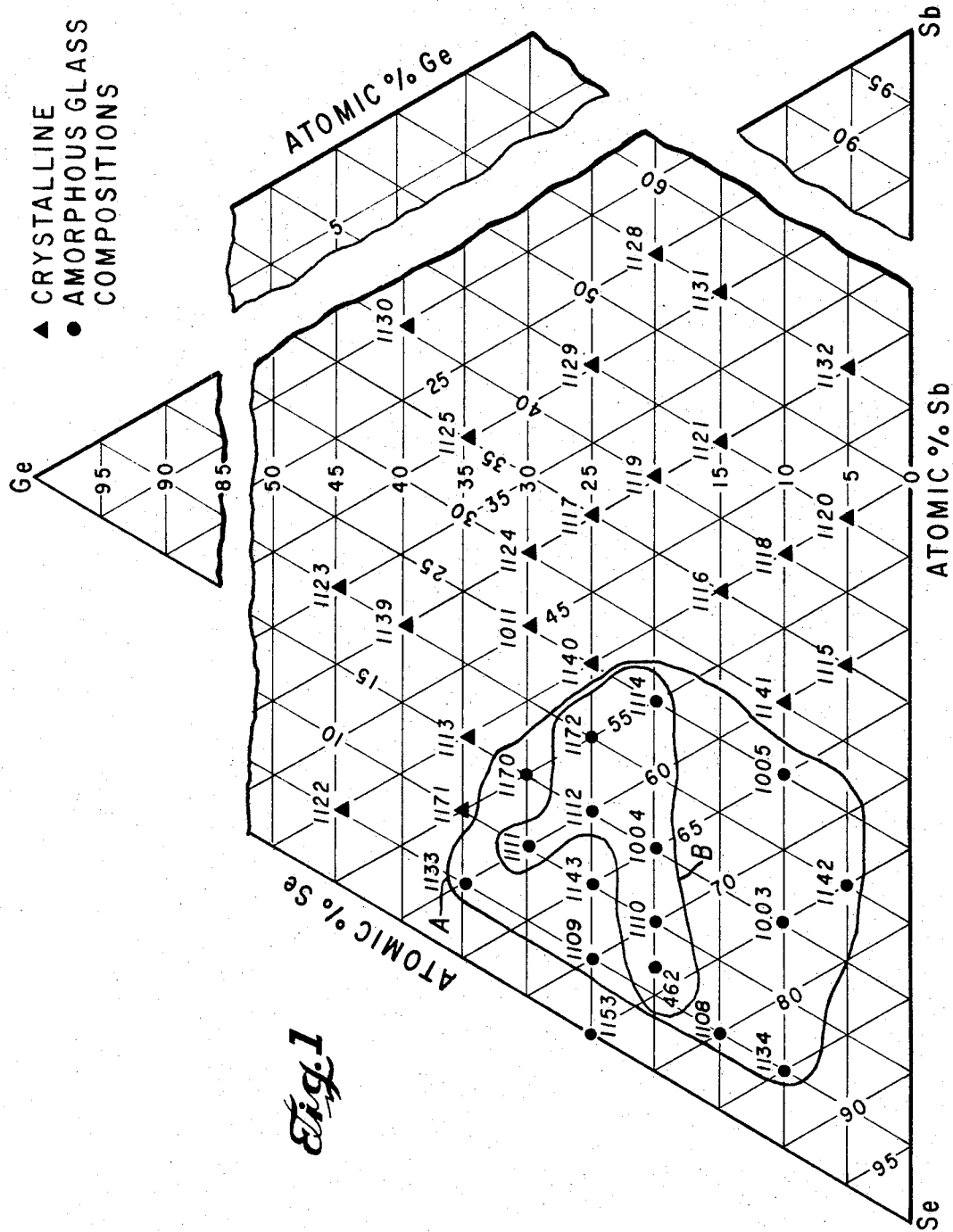
FIGURE 1 depicts a ternary diagram of the atomic percentages of germanium, antimony, and selenium for various amorphous compositions of matter of the invention.

Referring to FIGURE 1, various compositions of germanium, antimony, and selenium were compounded and evaluated to determine whether they were amorphous or crystalline. The general procedure for making the various compositions is described hereinafter.

Various atomic percentages of germanium, antimony, and selenium were chosen for each sample to be made. The appropriate amounts of the constituents were weighed and then placed in a previously cleaned quartz ampoule. An example of a suitable cleaning step for the ampoule is brushing in a suitable detergent for 30 minutes in solution, rinsing thoroughly in deionized water, and then drying. The total weight of each of the samples was between five and 15 grams. The constituents were placed in the cleaned tube, evacuated to about $10^{-4}$ torr, and sealed. The sealed tube was then placed in a furnace and gradually heated to a temperature of about 800° C. to 900° C. and held at that temperature for about 16 hours to provide sufficient time for the constituents to react completely with each other. The furnace was a rocking furnace which may be of any suitable design to provide agitation of the constituents so as to achieve complete reaction thereof. The samples were then removed from the furnace and held in a vertical position in air for air quenching and allowed to cool to room temperature. Care was taken throughout the process to prevent heating the constituents in air to avoid causing any oxide formation. In particular, in some cases the inside surface of the ampoule was carbon coated for the purpose of chemically reducing any extraneous oxides present.

The sample compositions which failed to form amorphous glass by the air quench-cooling technique and became crystalline after quenching are presented in Table I below, whereas the compositions which formed amorphous glass are presented in Table II below, with the softening point results obtained for the glass. The softening point is defined as the temperature at which a pointed quartz rod under a 70 grams load penetrates a smooth surface to a depth of 0.05 mm. where the rod is in perpendicular alignment with respect to the sample and the point defines a 90° included angle. The reaction conditions for the samples in Tables I and II below were the same:

TABLE I

| Sample No. | Composition, Atomic Percent | | |
|---|---|---|---|
| | Ge | Sb | Se |
| 1011 | 30 | 25 | 45 |
| 1113 | 35 | 15 | 50 |
| 1115 | 5 | 35 | 60 |
| 1116 | 15 | 35 | 50 |
| 1117 | 25 | 35 | 40 |
| 1118 | 10 | 40 | 50 |
| 1119 | 20 | 40 | 40 |
| 1120 | 5 | 45 | 50 |
| 1121 | 15 | 45 | 40 |
| 1122 | 45 | 5 | 50 |
| 1123 | 45 | 20 | 35 |
| 1124 | 30 | 30 | 40 |
| 1125 | 35 | 35 | 30 |
| 1128 | 20 | 55 | 25 |
| 1129 | 25 | 30 | 45 |
| 1130 | 40 | 20 | 40 |
| 1131 | 15 | 55 | 30 |
| 1132 | 5 | 55 | 40 |
| 1139 | 40 | 20 | 40 |
| 1140 | 25 | 25 | 40 |
| 1141 | 10 | 30 | 60 |
| 1171 | 35 | 10 | 55 |

TABLE II

| Sample No. | Composition, Atomic Percent | | | Softening Point in °C. |
|---|---|---|---|---|
| | Ge | Sb | Se | |
| 1003 | 10 | 15 | 75 | 190 |
| 1004 | 20 | 15 | 65 | 280 |
| 1005 | 10 | 25 | 65 | 198 |
| 1108 | 15 | 5 | 80 | *175 |
| 1109 | 25 | 5 | 70 | *350 |
| 1110 | 20 | 10 | 70 | 272 |
| 1111 | 30 | 10 | 60 | 326 |
| 1112 | 25 | 15 | 60 | 312 |
| 1114 | 20 | 25 | 55 | 275 |
| 1133 | 35 | 5 | 60 | 355 |
| 1134 | 10 | 5 | 85 | 162 |
| 1142 | 5 | 20 | 75 | *125 |
| 1143 | 25 | 10 | 65 | 347 |
| 1153 | 25 | | 75 | 398 |
| 1170 | 30 | 15 | 35 | *320 |
| 1172 | 25 | 20 | 55 | 288 |
| 462 | 20 | 7 | 73 | 270 |

*Approximate value.

In FIGURE 1, the peripheral line A generally circumscribes the amorphous compositions of germanium, antimony, and selenium according to the invention. The samples which failed to form amorphous glass by the air quench-cooling technique (listed in Table I) are plotted on FIGURE 1 by block triangle and identified by sample ternary numbers. The sample compositions forming amorphous glass (listed in Table II) are also plotted in FIGURE 1 within the area generally circumscribed by line A and designated by black dots, each dot being identified by a sample number. As may be seen from FIGURE 1, in the vicinity of the binary glass example 1153, line A is substantially parallel to the Ge-Se axis but does not include said binary glass example, line A being directed to ternary glasses.

Figure 2:
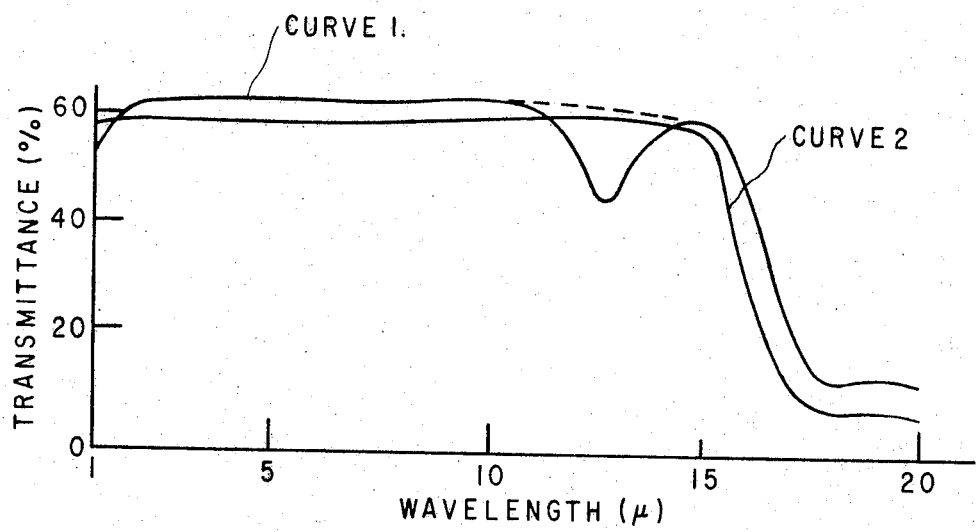
FIGURE 2 is a graphical representation of percent transmission at room temperature at various wave lengths of the electromagnetic spectrum for various glass compositions according to this invention.

In FIGURE 2, the percent transmission of the electromagnetic spectrum at room temperature in the one to 20 micron wave length region is plotted for various of the glass samples listed in Table II. Curve 1 represents a "typical" set of transmission characteristics common to the amorphous glass compositions designated in FIGURE 1 except for the composition $Ge_{25}Sb_{10}Se_{65}$. A moderately strong absorption band at approximately $13\mu$ was observed, as shown by Curve 1, possibly due to the presence of extraneous oxides in these represented compositions. This absorption band was decreased, however, when the ampoule in which the samples were prepared had its inside surface initially coated with a material, such as carbon for example, in order to reduce these extraneous oxides. Other materials may be added to the melt, as for example aluminum, which will tend to reduce the extraneous oxides. The resulting curve, after elimination of the absorption band, is represented by the dotted line. Curve 2 represents the transmission characteristics of the composition $Ge_{25}Sb_{10}Se_{65}$, these characteristics having been observed to depart from the "typical" set of Curve 1.

Figure 3:
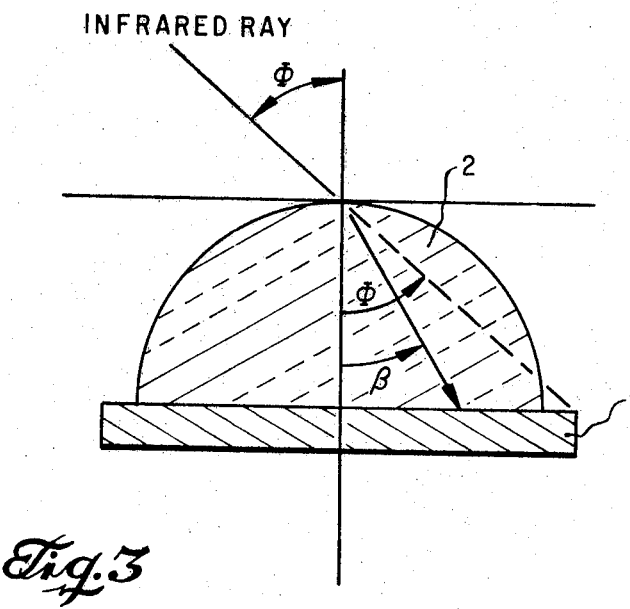
FIGURE 3 illustrates one particular form of the glass compositions of this invention, usable as an infrared transmitting element, such as a dome or lens, within an infrared detection system.

FIGURE 3 depicts a form of the glass compositions of this invention usable within a particular infrared detecting system. The detecting system is normally composed of a detector 1 having a responsive element sensitive to infrared energy striking its surface, and an infrared transmitting element 2 such as a dome or lens in optical contact with the detector. The optical properties of the amorphous glass compositions of this invention make them particularly suited, among other applications, for use as the transmitting element 2. In addition to being substantially transparent to infrared rays over a broad range of the infrared spectrum, as depicted in FIGURE 2, all of the compositions have relatively high indexes of refraction, ranging from approximately 2.4 to 3.0 at $3-5\mu$ wave length. Consequently, when infrared rays strike the dome 2 at the incident angle $\Phi$, as pictured in FIGURE 3, the high index of refraction of the dome material causes the rays to be bent toward the detector unit 1 at the angle of refraction $\beta$, thus increasing the efficiency of detection.

The amorphous glass compositions of this invention offer substantial advantages for the fabrication of the transmitting elements for a variety of other reasons. First, there is a wide range of physical properties from which the designer may choose. For example, the softening points range from approximately 162° C. to 398° C., and the Knoop hardnesses of the compositions have been measured from 92 to as high as 174. Second, these compositions offer substantial advantages over crystalline material in that they may be heated to a molten state and easily worked into desired shapes and sizes. Third, the reasonably high softening points and available hardnesses offer greater ease in grinding, polishing, and handling operations, as well as stability to thermal shocks.

In particular, the amorphous compositions generally defined by the Line B in FIGURE 1 (specifically $Ge_{20}Sb_{10}Se_{70}$, $Ge_{20}Sb_{15}Se_{65}$, $Ge_{20}Sb_{25}Se_{55}$, $Ge_{20}Sb_{7}Se_{73}$, $Ge_{25}Sb_{20}Se_{55}$, $Ge_{25}Sb_{15}Se_{60}$, and $Ge_{30}Sb_{10}Se_{60}$) were found to be exceptionally stable up to about 550–650° C. in an inert atmosphere, such as nitrogen, approximately 50–100° C. above that temperature required in order to pour the molten material into molds for fabricating optical hardware. In addition, these amorphous compositions were cooled slowly (as slow as 1° C. per minute) and after casting remained substantially, if not completely, amorphous.

It should be understood that although most of the samples discussed above were essentially germanium, antimony, and selenium, minor percentages of silicon, sulfur, phosphorus, tellurium, arsensic, bismuth, etc. may be used in the glass of the invention to provide variations in the softening point and wave length transmission of the glass compositions.

Although only the air quench-cooling method has been described for making the amorphous compositions of matter other methods could be used. It is also to be appreciated that many other variations and changes in the invention will immediately suggest themselves to those skilled in the art, and such variations and changes are deemed to be within the purview and scope of the invention as defined in the appended claims.

What is claimed is:

1. Ternary glass compositions consisting essentially of germanium, antimony and selenium and lying within line A of FIGURE 1.

2. An infrared detection system comprising a detector sensitive to infrared energy and a transmitting element in optical contact with said detector, said transmitting element comprising a ternary glass composition consisting essentially of germanium, antimony and selenium, and lying within line A of FIGURE 1.

3. Ternary glass compositions as circumscribed by line B in the ternary diagram of FIGURE 1, said compositions being stable up to approximately 550–650° C. in an inert atmosphere.

4. An infrared detection system comprising a detector sensitive to infrared energy and a transmitting element in optical contact with said detector, said transmitting element comprising a ternary glass composition consisting essentially of germanium, antimony and selenium, and lying within line B of FIGURE 1.

5. An infrared detection system comprising a detector sensitive to infrared energy and a transmitting element in optical contact with said detector, said transmitting element being a ternary amorphous glass composition comprising in major proportion 5 to 37 atomic percent germanium, greater than 0 to 28 atomic percent antimony, and 53 to 85 atomic percent selenium.

References Cited

Borisova et al. (I)—Zhurnal Prikladnoi Khimii, vol. 35 No. 4, pp. 774–7.

Borisova et al. (II)—Kinetics of Dissolution of The Glassy Germanium-Selenium System in Alkaline Solutions.

J. of Applied Chemistry, vol. 36 (1963), pp. 221–224 English Translation of pp. 233–236 Zhurnal Prikladnoi Khimii, vol. 36, No. 2 (February 1963).

HELEN M. McCARTHY, *Primary Examiner.*